US007860880B2

(12) United States Patent
Drucker

(10) Patent No.: US 7,860,880 B2
(45) Date of Patent: Dec. 28, 2010

(54) SYSTEM, METHOD AND PROCESS FOR MANAGING PROBLEMS AND RISKS ASSOCIATED WITH A CONSTRUCTION PROJECT USING PROJECT-SPECIFIC SOFTWARE AND PROJECT NOTICE FORMS RELATIVE TO THE CONSTRUCTION CONTRACT

(75) Inventor: Robert A. Drucker, Randolph, NJ (US)

(73) Assignee: Peckar & Abramson, A Professional Corporation, River Edge, NJ (US)

( * ) Notice: Subject to any disclaimer, the term of this patent is extended or adjusted under 35 U.S.C. 154(b) by 1029 days.

(21) Appl. No.: 11/068,762

(22) Filed: Mar. 1, 2005

(65) Prior Publication Data

US 2005/0197856 A1 Sep. 8, 2005

Related U.S. Application Data

(60) Provisional application No. 60/549,048, filed on Mar. 1, 2004.

(51) Int. Cl.
*G06F 17/00* (2006.01)
*G06F 7/00* (2006.01)
(52) U.S. Cl. .................. 707/769; 707/942; 705/311
(58) Field of Classification Search .................. None
See application file for complete search history.

(56) References Cited

U.S. PATENT DOCUMENTS

| 5,182,705 | A | * | 1/1993 | Barr et al. ................... 705/11 |
| 5,557,515 | A | * | 9/1996 | Abbruzzese et al. ........... 705/9 |
| 5,692,206 | A | * | 11/1997 | Shirley et al. ............... 715/531 |
| 6,006,242 | A | * | 12/1999 | Poole et al. ................. 715/209 |
| 6,279,109 | B1 | * | 8/2001 | Brundridge .................... 713/2 |
| 6,341,287 | B1 | | 1/2002 | Sziklai et al. ............... 707/102 |
| 6,714,829 | B1 | | 3/2004 | Wong ......................... 700/101 |
| 6,934,715 | B2 | * | 8/2005 | Kalmes et al. ............... 707/102 |
| 6,957,384 | B2 | * | 10/2005 | Jeffery et al. ................ 715/202 |
| 6,961,902 | B2 | * | 11/2005 | Anecki et al. ................ 715/222 |
| 7,062,514 | B2 | * | 6/2006 | Harris ................... 707/999.104 |

(Continued)

OTHER PUBLICATIONS

Cushman, R.F., J.D. Carter, P.J. Gorman and D.F. Coppi, eds. "Construction Disputes: Representing the Contractor", New York:Aspen Law & Business, 2001, pp. 17-67, 109-140 and 163. KF8925.B84. C654. ISBN 0-7355-2174-3.*

(Continued)

*Primary Examiner*—Luke S Wassum
(74) *Attorney, Agent, or Firm*—Richard A. Catalina, Jr.

(57) ABSTRACT

A system and method are disclosed for providing instant access to notices for any notice-triggering event which may occur on a specific construction project. More specifically, the present invention is essentially a system and method for managing problems and risks associated with a wide range of construction projects using a project-specific software, system, method and process, usually accompanied by "hard copy" printouts of the relevant notices, forms and letters and the specific contract provisions that require a specific notice to be given by the construction company. In one embodiment, a customized CD-ROM package of notice documents that fully comply with a particular contract is prepared, which software package is then utilized to bring up appropriate notice document on a computer screen, which notice document is then completed by a user by inserting relevant information in open fields of the draft notice document.

34 Claims, 2 Drawing Sheets

U.S. PATENT DOCUMENTS

| | | | | |
|---|---|---|---|---|
| 7,080,076 | B1* | 7/2006 | Williamson et al. | 707/9 |
| 7,089,203 | B1* | 8/2006 | Crookshanks | 705/37 |
| 7,089,268 | B2* | 8/2006 | Yoshimura et al. | 707/201 |
| 7,194,677 | B2* | 3/2007 | Rizk et al. | 715/205 |
| 7,260,584 | B2* | 8/2007 | Hailey et al. | 707/102 |
| 7,529,701 | B2* | 5/2009 | Shields et al. | 705/35 |
| 2001/0027407 | A1 | 10/2001 | Mori | 705/9 |
| 2001/0034739 | A1* | 10/2001 | Anecki et al. | 707/500 |
| 2002/0042771 | A1* | 4/2002 | Shields et al. | 705/37 |
| 2002/0083090 | A1* | 6/2002 | Jeffrey et al. | 707/501.1 |
| 2002/0087705 | A1* | 7/2002 | Smyth | 709/229 |
| 2002/0111922 | A1* | 8/2002 | Young et al. | 705/80 |
| 2002/0133436 | A1* | 9/2002 | Hermreck et al. | 705/31 |
| 2002/0169753 | A1* | 11/2002 | Yoshimura et al. | 707/2 |
| 2002/0194274 | A1* | 12/2002 | Kroeger | 709/205 |
| 2003/0033187 | A1 | 2/2003 | Jones et al. | 705/9 |
| 2004/0012618 | A1* | 1/2004 | Finney | 345/703 |
| 2004/0117232 | A1 | 6/2004 | Benitez | 705/9 |
| 2004/0128180 | A1 | 7/2004 | Abel et al. | 705/9 |
| 2004/0153354 | A1* | 8/2004 | Nonaka et al. | 705/8 |
| 2004/0167797 | A1* | 8/2004 | Goncalves | 705/1 |
| 2004/0210470 | A1 | 10/2004 | Rusk | 705/9 |
| 2004/0261025 | A1* | 12/2004 | Rizk et al. | 715/530 |
| 2004/0267660 | A1* | 12/2004 | Greenwood et al. | 705/38 |
| 2005/0039115 | A1* | 2/2005 | Gordon et al. | 715/505 |
| 2005/0068567 | A1* | 3/2005 | Hull et al. | 358/1.15 |
| 2005/0108232 | A1* | 5/2005 | Rockey | 707/8 |
| 2005/0188299 | A1* | 8/2005 | Furman et al. | 715/513 |
| 2006/0010377 | A1* | 1/2006 | Anecki et al. | 715/530 |
| 2006/0036587 | A1* | 2/2006 | Rizk et al. | 707/3 |
| 2006/0085311 | A1* | 4/2006 | Hoerle et al. | 705/35 |
| 2006/0085322 | A1* | 4/2006 | Crookshanks | 705/37 |
| 2007/0011190 | A1* | 1/2007 | Finney | 707/102 |
| 2007/0016514 | A1* | 1/2007 | Al-Abdulqader et al. | 705/37 |
| 2007/0055637 | A1* | 3/2007 | Nelson | 705/80 |
| 2007/0283267 | A1* | 12/2007 | Jeffery et al. | 715/710 |
| 2007/0283288 | A1* | 12/2007 | Jeffery et al. | 715/776 |
| 2007/0294617 | A1* | 12/2007 | Kroeger | 715/530 |
| 2008/0046417 | A1* | 2/2008 | Jeffery et al. | 707/4 |
| 2008/0228815 | A1* | 9/2008 | Senn et al. | 707/104.1 |

OTHER PUBLICATIONS

Katz & Stone LLP "Subcontractor's Claim Partially Dismissed Based on Failure to Comply with Contractual Notice Requirements", Newsletter, downloaded from www.katzandstone.com/newsletters/junejuly2002.html, May/Jun. 2002.*

Holman, M.S., S.L. Gillis and S. Wampler "Notice: Inquiring Minds Want to Know—Navigating the Deep Waters of the AIA General Conditions", ohioconstructionlaw.com newsletter, vol. III, No. 2, Feb. 2002.*

Libor, M.R. "Getting to the Bottom of Construction Claims", ABA Forum on the Construction Industry/TIPS Fidelity & Surety Law Committee, Jan. 30, 2003.*

Henry, J.T., B.A. Kelley and J.R. Wandler "Impacts and Incentives: Recent Washington Construction Law Changes", Oles Morrison Rinker & Baker LLP, undated, but no earlier than 2004.*

Thelen Reid Brown Raysman & Steiner LLP "The Documentation Contractors Need to Support International Claims", downloaded from www.constructionweblinks.com/Resources/Industry_Reports_Newsletters/May_23_2005/thed.html, May 23, 2005.*

Balcar, A. "What the EJCDC C-700 Requires for Notice", ohioconstructionlaw.com newsletter, Jan. 2006.*

Molner, B. "Project Delays, Disruptions, and Changes", Ater Wynne LLP, Mar. 28, 2007.*

Fastenberg, C. "New York City Contract Claims: Complying with Dispute Resolution Procedures Requires Care", downloaded from www.constructionweblinks.com/Resources/Industry_Reports_Newsletters/May_07_2007/thed.html, May 7, 2007.*

Hyden, B.B. and S. Wampler "Contractual Notice in a Post-Dugan & Meyers World", brickerconstructionlaw.com newsletter, Sep. 2007.*

Peckar & Abramson LLP "ProjectNotice® Project Specific Software", product brochure, 2008.*

Chambers, R. "Scenario: Construction Contract Preparation and Management", downloaded from www.oasis-open.org, Jun. 2, 2003.*

Caplan, J. "Contract Automation: Digitizing the Party of the First Part", downloaded from CFO.com, Oct. 17, 2001.*

Chiu, D.K.W., S.C. Cheung and S. Till "A Three-Layer Architecture for E-Contract Enforcement in an E-Service Environment", Proceedings of the 36$^{th}$ Hawaii International Conference on System Sciences (HICSS'03), 2002.*

Angelov, S. and P. Grefen "An Approach to the Construction of Flexible B2B E-Contracting Processes", CTIT Technical Report Series 02-04, University of Twente, 2002.*

Xu, L. and M.A. Jeusfeld "Pro-active Monitoring of Electronic Contracts", Proceedings of the 15$^{th}$ International Conference on Advanced Information Systems Engineering (CAiSE 2003), Jun. 16-18, 2003, pp. 584-600.*

Grosof, B.N. and T.C. Poon "SweetDeal: Representing Agent Contracts With Exceptions using XML Rules, Ontologies, and Process Descriptions", MIT Sloan School of Management, Working Paper 4424-03, Jul. 2003.*

Neal, S., J. Cole, P.F. Linington, Z. Milosevic, S. Gibson and S. Kulkarni "Identifying Requirements for Business Contract Language: A Monitoring Perspective", Proceedings of the 7th IEEE International Enterprise Distributed Object Computing Conference (EDOC'03), 2003.*

Milosevic, Z., S. Gibson, P.F. Linington, J. Cole and S. Kulkarni "On Design and Implementation of a Contract Monitoring Facility", Proceedings of the First International Workshop on Electronic Contracting (WEC'04), 2004.*

Chambers, R. "Use Case and Problem Analysis of Construction Contract Transactions for Requirements Development", OASIS Legal XML eContracts TC, Version 1.0, downloaded from www.oasis-open.org/committees/download.php/8836/doc00003.doc, Aug. 15, 2004.*

Milosevic, Z., P.F. Linington, S. Gibson, S. Kulkarni and J. Cole "Inter-Organisational Collaborations Supported by e-Contracts", Proceedings of the 4th IFIP Conference on e-Commerce, e-Business and e-Government (I3E), Aug. 22-27, 2004.*

Tagg, R., Z. Milosevic, S. Kulkarni and S. Gibson "Supporting Contract Execution through Recommended Workflows", Proceedings of the 15th International Conference on Database and Expert Systems Applications (DEXA 2004), Aug. 30-Sep. 3, 2004, pp. 1-12.*

Upside Software, Inc. "Using UpsideContract's Workflow Engine to Improve Business Processes", downloaded from www.upsidesoft.com, Nov. 2004.*

Governatori, G. and A. Totolo "Modeling Contracts Using RuleML", Proceedings of the 17$^{th}$ Annual Conference on Legal Knowledge and Information Systems, 2004, pp. 141-150.*

Governatori, G. and Z. Milosevic "Dealing with Contract Violations: Formalism and Domain Specific Languages", Proceedings of the 9$^{th}$ International EDOC Enterprise Computing Conference (EDOC'05), 2005.*

* cited by examiner

Figure No. 1
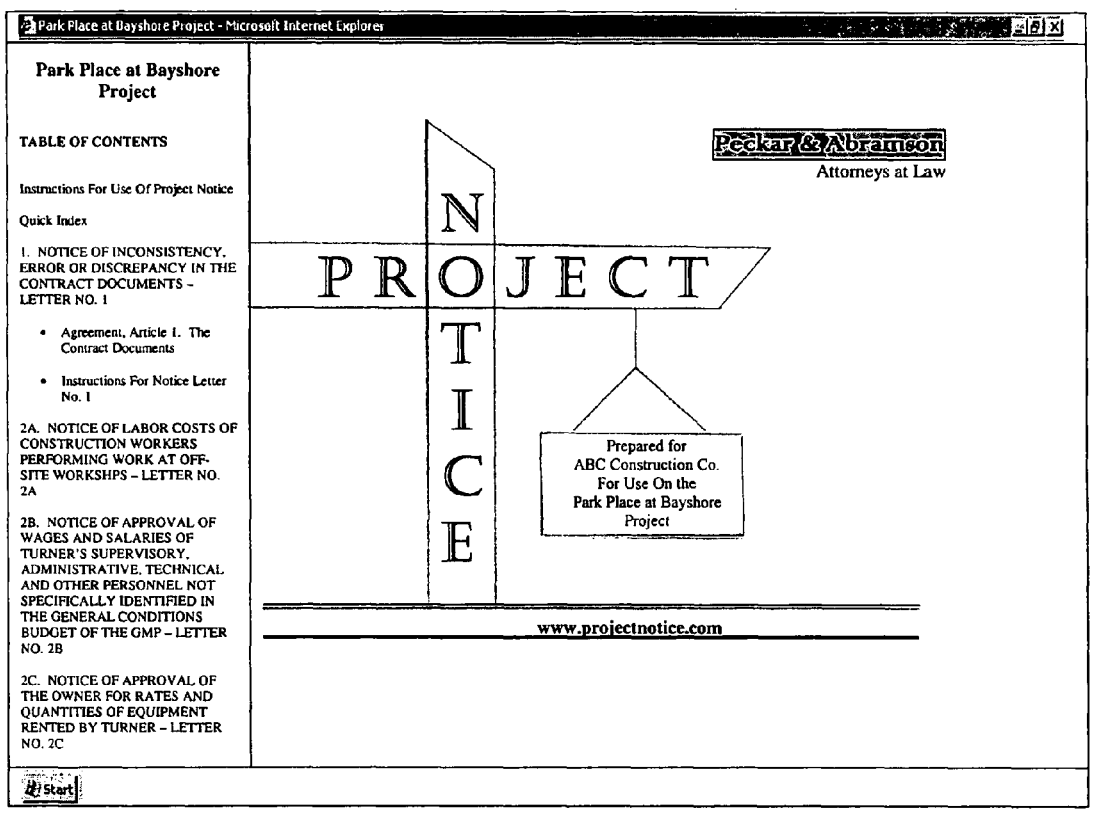

Figure No. 2

| | MS Word | WordPerfect | Rich Text | HTML |
|---|---|---|---|---|

INCONSISTENCY, ERROR OR DISCREPANCY IN THE CONTRACT DOCUMENTS – LETTER NO. 1

- Agreement, Article 1, The Contract Documents
- Instructions For Notice Letter No. 1

2A. NOTICE OF LABOR COSTS OF CONSTRUCTION WORKERS PERFORMING WORK AT OFF-SITE WORKSHOPS – LETTER NO. 2A

2B. NOTICE OF APPROVAL OF WAGES AND SALARIES OF TURNER'S SUPERVISORY, ADMINISTRATIVE, TECHNICAL AND OTHER PERSONNEL NOT SPECIFICALLY IDENTIFIED IN THE GENERAL CONDITIONS BUDGET OF THE GMP – LETTER NO. 2B

2C. NOTICE OF APPROVAL OF THE OWNER FOR RATES AND QUANTITIES OF EQUIPMENT RENTED BY TURNER – LETTER NO. 2C

2D. NOTICE OF REQUEST OF COSTS INCURRED IN TURNER'S HOME OFFICE – LETTER NO. 2D

2E. NOTICE OF APPROVAL EXPENSES TO BE INCURRED BY TURNER'S PERSONNEL

[Insert Date]

Vermicelli and Partners
5555 S. Bayshore Drive
Miami, FL 31333

Attention: Samuel Jones

Re: Park Place at Bayshore
    [Insert Reference to Subject Matter]

Dear Mr. Jones:

Pursuant to the Agreement, including Article 1, The Contract Documents, ABC Construction notifies the Architect and the Owner of its request for clarification of the following information in the Contract Documents:

[Identify in detail that portion of the Contract Documents that ABC has discovered is either incomplete, inconsistent, ambiguous or contains an error or omission and set forth the requested clarification.]

[or]

[State "See attached RFI No. ___ dated ___."]

[or]

[State "See attached subcontractor's letter dated ___ seeking clarification of the contract documents."]

[If Applicable Add]

[Upon our receipt of your clarification, we will be able to determine if this matter affects the Guaranteed Maximum Price or Time for Completion.]

SYSTEM, METHOD AND PROCESS FOR MANAGING PROBLEMS AND RISKS ASSOCIATED WITH A CONSTRUCTION PROJECT USING PROJECT-SPECIFIC SOFTWARE AND PROJECT NOTICE FORMS RELATIVE TO THE CONSTRUCTION CONTRACT

CROSS-REFERENCE TO RELATED APPLICATIONS

This application is a non-provisional application of and claims priority to and the benefit of U.S. Provisional Application, Ser. No. 60/549,048, filed Mar. 1, 2004, and entitled "System, Method and Process for Managing Problems and Risks Associated with a Construction Project Using Project-Specific Software and Project Notice Forms Relative to the Construction Contract," by Robert A. Drucker, which is incorporated herein by reference in its entirety.

FIELD OF THE INVENTION

This invention relates to the risk-management method and system for the construction industry using a project-specific software. More specifically, various embodiments of the present invention relate to a method and system for managing problems and risks associated with a specific construction project by providing instant access to notices mandated by a construction contract for any notice-triggering event which may occur on a specific project.

BACKGROUND OF THE INVENTION

Even experienced project and building construction management teams are challenged by strict contract notice and documentation requirements as may be required under the applicable construction contract (the "Contract"), potentially resulting in the inadvertent forfeiture, waiver, or loss of important rights and remedies. Imagine, for example, that a work stoppage has occurred on a construction project due to an event beyond the control or responsibility of the construction company (the "Construction Company"), thereby possibly triggering a number of notice requirements under the Contract. In order to get time and financial relief, the Contract requires that the Construction Company provide the applicable legal notice (the "Notice") to the owner of the project (the "Owner") and the architect (the "Architect").

This common practice occurs in one of two ways; either someone on the Construction Company's project staff writes a memo or letter using his or her best judgment as to what they think the Contract requires, relying upon the generalized knowledge of what is required under most Contracts in such circumstances, or alternatively, the staff member properly researches the Contract, drafts a letter and has it reviewed by a superior in the Construction Company or the Construction Company's legal counsel to ensure that it complies with the Contract. In either case, the result is often neither efficient nor effective. In the first case, there is a very good chance that the notice is insufficient and will be the source of legal problems later on. In the alternative case, the letter may be fine, but the time it has taken to ensure that result distracts the project staff from other important responsibilities. This situation is far from ideal, and if enough such circumstances arise, can have negative effects such as constraining the productivity of construction companies, exposing them to legal liability, and/or the like.

The present invention will enable a project manager to manage and eliminate the risk of required notice procedures with a software risk-management system, method and process.

DISCUSSION OF THE PRIOR ART

It should be highlighted that while there are a number of prior art references which relate to managing problems and risks associated with implementing complex projects, none of the noted references relate in any way to a risk-management method and system for the construction industry using a project-specific software. In particular, none of the prior art references relate to a method and system for managing problems and risks associated with a specific construction project by providing instant access to notices mandated by a construction contract for any notice-triggering event which may occur on a specific project. The present invention provides that utility.

U.S. Pat. No. 6,341,287 (issued Jan. 22, 2002 to Sziklai et al.) relates generally to the integrated management of information affected by regulatory changes, such as changes in environmental, health and safety laws, and non-regulatory changes. The system according to the Sziklai invention: provides various databases that contain information on operations and requirements concerning an activity or area of business; receives information on regulatory and non-regulatory changes that affect operations of the business; converts these changes in data entry forms, data processing and analysis procedures, etc.; and implements receipt of change information and dissemination of data processing and analysis results using the Internet. Notably, the Sziklai invention does not address the aforementioned need for easy access to the appropriate notice in response to virtually every project event for which the Contract contemplates a required notice.

U.S. Pat. No. 6,714,829 (issued Mar. 30, 2004 to Wong) references a method of scheduling a multi-task project such as a building construction project. More specifically, the Wong invention encompasses a method of scheduling a project consisting of a plurality of tasks and includes the steps of identifying critical and para-critical tasks of the project, ranking and displaying the critical and para-critical tasks in a chronological order, establishing and monitoring target finish dates, displaying actual completion dates of the displayed critical tasks adjacent to the displayed critical tasks, and adjusting the garget finish dates for all subsequent displayed critical tasks to reflect any variance between the target finish dates and actual finish dates.

U.S. patent application Ser. No. 10/414,941 (published on Oct. 21, 2004), by Rusk, generally relates to systems and methods for facilitating project management. According to the Rusk invention, a variety of operations applicable to project management may be performed, such as setting up tasks, subtasks, questions, and/or the like.

U.S. patent application Ser. No. 10/763,848 (published on Aug. 5, 2004), by Nonaka et al., generally relates to a method and system for managing project program change. More specifically, the Nonaka invention provides:

a project program change management system which is combined with a means of program change inference that traces or infers and specifies the tasks and the milestones that are directly and indirectly influenced by the program change and a means of program change notice that automatically inform the program change notices to the stake holders who are relevant to the tasks and the milestones that are influenced by the project program change. [Abstract].

U.S. patent application Ser. No. 10/318,938 (published on Jun. 17, 2004), by Benitez, pertains to a method of measuring the time that it will take to complete a construction project, thereby giving a rating that helps determine if a construction project will be completed on schedule.

U.S. patent application Ser. No. 10/331,154 (published on Jul. 1, 2004), entitled "Integrating Logistic and Financial Control of Projects," by Abel et al., generally relates to methods and apparatus, including computer program products, that implement techniques for controlling projects. The techniques include identifying a project characterized by a logistic structure, a financial structure and a responsibility mapping. The logistic structure includes a plurality of logistic objects representing activities related to the project. The financial structure includes one or more cost collectors representing financial responsibility related to the project. The responsibility mapping associates each activity represented in the logistic structure with a cost collector that is responsible for financial aspects of the activity.

U.S. patent application Ser. No. 10/201,761 (published on Feb. 13, 2003), entitled "Project Management System," by Jones et al., relates to a computer-based construction project management system for use in controlling the assembly of structures. More specifically, the Jones invention includes three software sub-systems: a first sub-system that receives data relating to an individual task of a construction project; a second sub-system for project scheduling that allows a planner to view and modify the timing and inter-relation of key events; and a third sub-system that converts data from the first and/or second sub-systems into a visual three dimensional graphical representation which allocates space in a three dimensional model of the structure to the task, as an event in time. The system according to the Jones invention implements the basic concept of: 1) receiving data from contributors relating to a production project; 2) arranging that data in an order of execution by a predetermined prioritization schema; 3) attaching a time period to the job; 4) and then converting the data into a graphical representation which allows a user to allocate space in a two or three dimensional model to a job.

Finally, U.S. patent application Ser. No. 09/765,221 (published on Oct. 4, 2001), entitled "Control and Inquiry System for Construction Work," by Mori, generally relates to a control and inquiry system for handling construction project information that is related to the construction of a building. More specifically, in accordance with the Mori invention, construction project information may be accessed by a home builder computer system and a client computer system that are coupled to the computer network. Like the other noted prior art references, besides the fact that it pertains to the construction industry and a computer system, the Mori invention has no bearing on the present invention as described and disclosed, which addresses the need for easy and immediate access to the appropriate notice document and accompanying information to virtually every project event for which the Contract contemplates a required notice.

Based upon the aforementioned, there remains a need in the constructions industry for a risk-management method and system that enables a project manager and his/her field staff to easily and instantly access notices mandated by a construction contract for any notice-triggering event which may occur on a specific project.

SUMMARY OF THE INVENTION

In accordance with one or more aspects of the invention, a project manager can manage and eliminate the risk of required notice procedures with a software risk-management system, method and process. One such software risk-management tool, system and process for the construction industry is the disclosed invention, now known under the name and registered trademark ProjectNotice®. ProjectNotice® is designed to provide instant access to Notices mandated by the Contract for any notice triggering event which may occur on a specific project. The software risk-management tool, system, method and process as contemplated may take the form of prerecorded compact discs containing partially printed legal Notice forms, Notices, and Notice letters all based on the specific provisions of the Contract at issue. More broadly, it may be multimedia software recorded on CD-ROMs and any other digital, analog and/or print media containing partially printed legal forms, notices, provisions, and contracts, and non-fiction books in the field of law. Accompanying the pre-recorded digital reference material containing such notices, forms, letters and other documents, is a written or "hard copy" notebook or manual containing all of the pre-recorded notices, forms and letters, along with an outline of the specific Contract provisions that require Notice to be given by the Construction Company upon the triggering of certain events. A further embodiment of the invention encompasses that the software tool further include directions regarding the use of any particular notice and the follow-up tasks that may be required with regard to that Notice. A further embodiment of the invention includes an outline of the specific Contract provisions that require Notice to be given by the Construction Company upon the triggering of certain events as to each such Notice.

The present invention is a system, process and/or method for managing problems and risks associated with a wide range of construction projects using a project-specific software, usually accompanied by "hard copy" printouts of the relevant notices, forms and letters and the specific contract provisions that require a specific notice to be given by the construction company.

Various embodiments provide, for instance, preparing a customized software package of notice documents that fully comply with a particular contract, then utilizing such software package to speedily identify and bring up appropriate notice document on a computer screen, and then completing such notice document by inserting relevant information in open fields of the draft notice document.

The benefits of the present invention are as follows:

- The elimination of the potential loss of valuable rights resulting from the all too common failure of field management personnel to adhere strictly to contract notice requirements. Instead, with little training, field management personnel can simply and literally comply with these requirements.
- Project management teams will save valuable time and eliminate uncertainty by easily accessing notices prepared by specialized Construction Industry legal counsel.
- Owners will receive timely notices that comply with their requirements, allowing them to make informed decisions as the project proceeds and forcing them to have to timely deal with the Contractor without the benefit of traditional technical defense of "missing notices" or "lack of adequate notice."

The elimination of weak bargaining positions and bad settlements resulting from the failure to meet the technical requirements of the contract notice provisions.

BRIEF DESCRIPTION OF THE DRAWINGS

FIGS. 1-2 are examples of ProjectNotice® screen images used in application of the present invention.

DETAILED DESCRIPTION OF THE PREFERRED EMBODIMENTS

According to embodiments of the present invention, a project-specific software, system, method and process, usually accompanied by "hard copy" printouts of the relevant notices, forms and letters and the specific contract provisions that require a specific notice to be given by the Construction Company, are used to manage problems and/or risks associated with a wide range of construction projects. As an illustration, one such embodiment of the present invention is as follows: 1) Once a project manager (or any other client) decides to implement the system of managing problems and risks associated with a particular construction project, a member of the software development team and legal counsel will carefully review the project manager's full set of Contract documents for that project; 2) After conducting a thorough review of the notice requirements in a Contract, general conditions, special conditions and other Contract documents, the software development team will prepare a customized CD-ROM package of Notice documents that comply with the Contract in all respects; 3) By checking the customized Table of Contents, which reflects a menu of events that require a Notice, and then clicking on the appropriate event, a hyperlink will bring up the requested Notice letter on the computer screen (the User may also click on other hyperlinks with regard to the Notice letter to bring up instructions on the computer screen as to that Notice, as well as the actual Contract provision(s) giving rise to each such Notice requirement and letter; and 4) After bringing the proper form Notice to the computer screen, the date and other relevant information pertaining to the Notice-triggering events may be inserted as required in the open fields of the draft, and then send on by hard copy or electronically, depending upon a particular computer system. Thus, with very little training, the project manager and his/her field staff will be able to easily access the appropriate notice in response to virtually every project event for which the Contract contemplates a required notice.

For every event that requires Notice, a particular package will include a separate letter or other required form of Notice as well as instructions on how, when and to whom notice should be sent to. The types of notices typically required include:

Notice of failure to make a progress payment on time

Notice of an event that may delay the project, entitling the contractor to an extension of time and, perhaps, additional compensation Notice of an event that entitles the contractor to an adjustment of its price Notice of a differing site condition Notice of a changed condition Notice of the interference by another contractor to the owner Notice of deficiencies in the design documents Notice of any of the events listed in the "time extension" clause for which an extension of time may be granted, including unusually inclement weather, a strike, etc.

Notice of the owner's failure to perform an act required of it under the contract Notice of receipt of a subcontractor's claim for additional compensation Notice of a conflict, discrepancy or ambiguity in the plans or specifications discovered by the contractor upon its review of the contract documents Notice of a request for indemnification and defense for damages that have been or may be incurred by the contractor Notice of the contractor's discovery of hazardous materials on the site The above listed notices are typical, but not exclusive nor exhaustive. If a project manager decides to implement the disclosed invention within a particular construction project, there will be nothing "typical" about his/her program. His/her program will be completely customized—and include all of the contractually required notices.

A particular popular and preferred embodiment of the disclosed invention contemplates that the relevant form Notice letters and the Contract provisions upon which they are based, including directions on how to use the pre-recorded forms and the attendant follow-up tasks associated therewith, are pre-recorded by the Construction Company's project management team and/or legal counsel on CD-ROM. Rather than merely copying such documents and Contract provisions on the media, all of the documents and contract provisions are organized in a software based "user friendly" graphical user interface or "GUI" onto the CD-ROM, which is formatted for "auto run" upon insertion into a CD-ROM drive in a personal computer.

Upon inserting the Compact Disk into the CD-ROM drive, the disc begins to auto run, thereby opening a window on the computer monitor, in this example a Windows® Internet Explorer® window, which welcomes the user and provides basic information on how to use the software process and system. After reading and closing the "Welcome Window" a Table of Contents will appear. For easy reference, the Table of Contents has been structured to allow the User to click on and proceed right to the Notice letter to be utilized or to the supporting information provided with each Notice letter. See FIG. 1 attached hereto. After a particular Notice letter is selected and appears in the right column, the Table of Contents will remain on the screen for easy access. See FIG. 2 attached hereto. The display width of the Table of Contents can be adjusted by each User by dragging the right side of the table either to the right or left on the screen. If at anytime, the User has clicked on an entry in the Table of Contents and wants to return to the Home page, the User may click on the line "Table of Contents" at the top of the Table.

In this preferred embodiment, for each Notice letter identified in the Table of Contents, ProjectNotice® sequentially provides the following three Documents which may be accessed by clicking the appropriate hyperlink in the left column:

a. The form of the Notice letter to be sent out by the Construction Company which is highlighted for the Company's insertion of information relevant to the events for which notice is being communicated.

b. The relevant portion of the Contract provision which establishes the parameters for issuing the Notice letter has been scanned in and highlighted for easy reference. The entire provision should be reviewed by the User as it appears in the Contract Documents before the Construction Company sends out a Notice Letter.

c. Specific Instructions for the development and issuance of each Notice letter and the identification of the follow-up information or action to be undertaken by the Construction Company subsequent to its issuance of the contractually required Notice Letter.

All three documents may be easily accessed by clicking the appropriate hyperlink in the left column of the ProjectNotice® GUI. See FIGS. 1 and 2.

A preferred embodiment of the present invention contemplates that after review of the relevant Contract, a customized CD-ROM package of notice documents is prepared that complies with the Contract in all respects. The prepared letters will refer specifically to the Contract provisions, both by designation of the Contract section and by utilizing the particular words that meet the requirements of that section. This package will also include instructions for each notice, such as when it must be sent, to whom it must be sent, what information or other documentation must accompany the notice, and what follow-up, if any, must occur—and when. As such, construction field staff will easily be able to diary follow-up based on those instructions. Thus, with very little training, the field staff will be able to easily access the appropriate notice in response to virtually every project event for which the Contract contemplates a required notice.

While the foregoing is directed to embodiments of the present invention, other and further embodiments of the invention may be devised without departing from the basic scope thereof.

Notice letters in ProjectNotice® contain bold-face type which requires the Construction Company to input essential information appropriate to the events for which notice is being communicated and further includes italicized type for specific instructions for the User with respect to each such Notice letter. Each Notice letter in the software application and appearing on the computer monitor is in "read-only" format and must be copied and pasted into a new document on the Construction Company's word processing system before information is inputted into the document. Although not meant to limit the nature and scope of the invention, testing of the invention shows that using a "read-only" format for each Notice letter prevents a User from making inadvertent mistakes, changes or edits to the form Notice letter and then saving those mistakes to the form document on the media. After the essential information is inputted by the Construction Company into the Notice letter, all bold face and italicized type should be deleted before the Notice letter is sent out. The Notice letters may be copied into the Construction Company's word processing system by utilizing the following procedure:

a. Microsoft Word®: If the Construction Company's word processing system utilizes any form of Microsoft Word®, right clicking on the button bar at the top of the page entitled "MS Word" will open the "Save As" window, whereupon the User will save the Notice letter as a designated Microsoft Word® file that the User is able to locate when Microsoft Word® is accessed. The User may minimize ProjectNotice® and open up Microsoft Word® and the saved file. As such the User is now ready to make the final edits in the Notice letter on the Construction Company's word processing system. The Notice letter as it appears in ProjectNotice® will remain unchanged. A preferred embodiment of the invention discloses that the various form Notice letters are preformatted in several popular word processing software formats, including Microsoft® Word® and Corel® Word Perfect®, among others. As such, upon right clicking the applicable button on the top button bar, the "form" Notice letter may be saved by the User in the specific file format of the User's word processing software application. This specific process for accessing and saving particular form Notice letters is not meant to be exclusive, as it will be apparent to those skilled in the art that documents may be saved in a variety of methods and manners and within a variety of word processing software applications.

b. Word Perfect: If the Construction Company's word processing system utilizes Word Perfect®, right clicking on the button bar at the top of the page entitled "Word Perfect" will open the "Save As" window, whereupon the User will save the Notice letter as a designated Word Perfect® file that the User is able to locate when Word Perfect® is accessed. The user may minimize ProjectNotice® and open up Word Perfect® and the saved file. As such the User is now ready to make the final edits in the Notice letter on the Construction Company's word processing system. The Notice letter as it appears in ProjectNotice® will remain unchanged.

c. If the Construction Company's word processing systems utilizes a system other than Microsoft Word® or Word Perfect®, right clicking on the button bar at the top of the page entitled "Rich Text" will open the "Save As" window, whereupon the User will save the Notice letter as a designated file under the User's word processing software application that the User is able to locate when the word processing software is accessed. The User may minimize ProjectNotice® and open up the word processing system and the saved file. As such the User is now ready to make the final edits in the Notice letter on the Construction Company's word processing system. The Notice letter as it appears in ProjectNotice® will remain unchanged.

d. If the procedures described in subparagraph a, b or c above do not copy the Notice letter into any of the above noted word processing systems, the User may simply right click on the button bar at the top of the page entitled "HTML," which will open the "Save As" window, whereupon the User will save the Notice letter as a designated file under the User's word processing software application that the User is able to locate when the word processing software is accessed. The User may minimize ProjectNotice® and open up the Construction Company's word processing system and the saved file. As such the User is now ready to make the final edits in the Notice letter on the Construction Company's word processing system. The Notice letter as it appears in ProjectNotice® will remain unchanged.

VARIOUS EXAMPLES OF AN EMBODIMENT OF THE INVENTION

In one example of an embodiment of the invention, the following table presents a variety of typical Notice letters that may be required under a specific construction Contract. Since no two construction contracts are the same, the Notice letters that a Construction Company may need to provide pursuant to the specific language and provisions of the Contract will obviously vary. However, the following list presents some of the more common letters that may be required under a typical Contract:

| Notice Letter | Events For Which Notice Is To Be Given |
| --- | --- |
| No. 1 | Discovery of Errors, Omissions or Inconsistencies in the Design Documents |

-continued

| Notice Letter | Events For Which Notice Is To Be Given |
|---|---|
| No. 2 | Change to Construction Company's Personnel |
| No. 3 | Contract Documents May Violate Applicable Laws |
| No. 4 | Discovery of Hazardous Material on Site |
| No. 5 | Deviation from Contract Documents in Shop Drawings or Other Submittals |
| No. 6 | Intention to Cut, Patch or Alter Work of the Owner or its Other Contractors |
| No. 7 | Discrepancies, Defects or Delays in the Work of Separate Contractor |
| No. 8 | Errors, Inconsistencies or Omissions in Contract Documents Discovered From Field Measurements and/or Verification of Field Conditions |
| No. 9 | Intention to Use Explosives on the Project Site |
| No. 10 | Discovery of Infringement of a Patent or Intellectual Property Rights |
| No. 11 | Request to Waive Bonding Requirement for Subcontractor |
| No. 12 | Request to Modify, Cancel or Amend Scope of Warranty Provisions of a Subcontract |
| No. 13 | Request for an Extension of Time |
| No. 14 | Request for Work to be Inspected, Tested or Approved |
| No. 15A | Test Result Indicating Non-Compliance with Contract Documents |
| No. 15B | Proposed Corrective Actions to Remedy Non-Compliant Test Results |
| No. 16 | Request for a Reduction of Retainage |
| No. 17A | Substantial Completion Has Been Achieved |
| No. 17B | Resubmission of Substantial Completion After Architect and/or Owner's Refusal to Certify Substantial Completion |
| No. 17C | Application for Payment Upon Achievement of Substantial Completion |
| No. 18 | Reservation of Unsettled Claims Upon Submission of Final Payment Application |
| No. 19A | Construction Manager's Change Order Notice for an Adjustment to GMP and/or Substantial Completion Date |
| No. 19B | Combined Request for Extension of Time and Change Order Notice |
| No. 20 | Reservation to Pursue Claim for Change to GMP or Contract Time |
| No. 21 | Discovery of Unforeseen Conditions and Request for Determination |
| No. 22 | Final Invoice for All Preconstruction Services Upon Owner's Termination Before Construction Phase |
| No. 23A | Notification of Materials, Equipment and Services Which Cannot Be Cancelled Upon Owner's Termination for Convenience |
| No. 23B | Payment Due Upon Owner's Termination for Convenience |
| No. 24 | Change Order Request Due to Suspension of Work by Owner |
| No. 25 | Suspension of Work by Construction Company Due to Owner's Failure to Make Payment |
| No. 26A | Termination by Construction Company Due to Suspension of Project for 12o Days |
| No. 26B | Request by Construction Company for Failure of Owner to Make Payment Within 30 Days |
| No. 27A | Request for Cost of the Work Including Transportation, Maintenance Costs of All Temporary Facilities, Materials, Supplies and Equipment and Hand Tools |
| No. 27B | Request for Approval/Reimbursement of Rental Rates that Exceed Eighty Percent of the Allowable Rate |
| No. 27C | Request for Approval/Reimbursement of Cost of Acquisition of Photocopy and Computer Equipment for the Project |
| No. 27D | Request for Approval/Reimbursement of Costs Incurred in the Performance of the Work |
| No. 27E | Request for Approval/Reimbursement of Transportation Costs of the Construction Manager and Personnel |
| No. 27F | Request for Approval/Reimbursement of Overhead and General Expenses |
| No. 27G | Request for Approval/Reimbursement of Costs Incurred by Construction Manager's Personnel |
| No. 28 | Request for Approval to Disclose Confidential Information |
| No. 29 | Request for Approval to Use of Trademarks or Trade Names of the Owner |
| No. 30 | Injury or Damage to Person or Property |
| No. 31 | Assignment, Sublet or Transfer of Interest in the Agreement |
| No. 32 | Destruction of Accounting Records |

All of the above listed form Notice letters are based upon specific Notice requirements in specific Contract provisions.

A particularly popular and preferred embodiment of the disclosed invention contemplates that the relevant Notice letters and the Contract provisions upon which they are based be pre-recorded by the Construction Company's project management team and/or legal counsel on CD-ROM. Rather than merely copying such documents and Contract provisions on the media, all of the documents and contract provisions are organized in a software based "user friendly" graphical user interface or "GUI" onto the CD-ROM, which is formatted for "auto run" upon insertion into a CD-ROM drive in a personal computer, whereupon the software automatically opens and appears on the User's computer monitor screen.

Example One

The Construction Contract requires that the Construction Company issue a Notice upon the discovery of any errors, omissions or inconsistencies in the design documents. The specific language in the Contract may read as follows:

2.4.3 In case of omissions or discrepancies between the Contract Documents, Construction Manager shall secure written instructions from Owner and Architect before proceeding with the Work affected by omissions or discrepancies. Construction Manager shall assume full responsibility for proceeding with such work without approval or instructions from Owner and Architect.

2.4.4 Since the Contract Documents are complementary, before starting each portion of the Work, the Construction Manager shall carefully study and compare the various Drawings and other Contract Documents relative to that portion of the Work, as well as the information furnished by the Owner pursuant to the Project, shall take field measurements of any existing conditions related to that portion of the Work and shall observe any conditions at the site affecting it. These obligations are for the purpose of facilitating Construction Manager's performance of the Work and are not for the purpose of discovering design errors, omissions, or inconsistencies in the Construction Documents. The construction Manager is not required to ascertain that the Contract Documents are in accordance with applicable laws, except for those portions of the Contract Document prepared by Construction Manager, its Subcontractors or anyone for whom they are responsible and for those documents prepared by Construction Manager, its Subcontractors or by anyone for whom they are responsible in connection with portions of the Work which are to be designed and built by the Construction Manager, its Subcontractors or others whom they are responsible as required by the Contract Documents; however, any errors, inconsistencies or omissions discovered by the Construction Manager shall be reported promptly to the Architect as a request for information in such form as the Architect and Owner may require. Any design errors or omissions noted by the Construction Manager during this review shall be reported promptly to the Architect, but it is recognized that the Construction Manager's review is made in the Construction Manager's capacity as a contractor and not as a licensed design professional.

The foregoing Contract provision therefore requires a proper Notice, which has already been contemplated by the Construction Company's legal and project team and is incorporated into the ProjectNotice® system as Letter No. 1, Discovery of Errors, Omissions or Inconsistencies in the Design Documents. The specific Contract provision is included, either in the accompanying "hard copy" manual or reference guide, the CD-ROM (as a hyperlink in the left column as is demonstrated in FIG. 1), or both. The Form of Letter Notice 1 is readily extracted by clicking the Letter No. 1 hyperlink on the ProjectNotice® GUI, which opens the following form Notice letter in the right screen of the ProjectNotice® window on the computer monitor:

---

[Insert Date]
XYZ Architects, Inc.
150 Avenue of the Americas, Suite 1000
New York, New York 10112
Attention: James Smith
Re:   New World Industries Building and Parking Garage
       [Insert Reference to Subject Matter]
Dear Mr. Smith:
   Pursuant to the Construction Management Agreement, including Article 2.4.3 of the General Provisions, Valley Construction Company notifies the Architect of the following errors, inconsistencies or omissions which it discovered in the Contract Documents:
[Identify in detail that portion of the Contract Documents that Valley Construction Company has discovered is either, incomplete, inconsistent, ambiguous, or contains an error or omission and set forth the requested clarification.]
          [or]
[State "See attached RFI No.___dated_____.]
          [or]
[State "See attached subcontractor's letter dated_____ seeking clarification of the contract documents."]
          [If Applicable Add]
[Upon our receipt of your clarification, we will be able to determine if this matter affects the Guaranteed Maximum Price or Time for Completion.]
We look forward to promptly receiving your written response to this Request for Information.
Sincerely,
VALLEY CONSTRUCTION COMPANY
[Insert name and title]
cc: Thomas Jones, Esq.

---

Directions for use of Notice Letter 1 also are included, either in the accompanying "hard copy" manual or reference guide, the CD-ROM (as a hyperlink in the left column as is demonstrated in FIG. 1), or both. The directions for use of Notice 1 may read as follows:

Instructions for the Issuance of Notice Leter No. 1

1. Addressee: Notice Letter must be sent to Addressee designated in the Letter, unless the identity of the Addressee has been properly changed by the Owner.
2. Delivery of Notice Letter: The Notice Letter must be sent by either personal hand delivery, by a nationally registered overnight delivery service or by certified mail, return receipt requested.
3. Time for Sending Notice Letter: Notice Letter should be sent promptly by Valley Construction Company discovering an apparent error, inconsistency, or omission in the Contract Documents. No other specific time period for sending the Notice Letter is set forth in the Contract Documents.
4. Required Information to be Inserted in Notice Letter: Open spaces for Valley Construction Company's inclusion of required information have been incorporated into the Notice Letter. Valley Construction Company must insert in or enclose with the Notice Letter the following information before sending the letter:
   a. The date of the Notice Letter
   b. Insert subject matter in reference line.
   c. Identify in detail that portion of the Contract Documents that Valley Construction Company has discovered is either incomplete, inconsistent, ambiguous or contains an error or omission and set forth the requested clarification.
   d. If applicable, State "See attached RFI No. _____ dated _____." Or. "See attached subcontractor's letter dated _____ seeking clarification of the Contract Documents."
   e. If applicable, add "Upon our receipt of your clarification, we will be able to determine if this matter affects the Guaranteed Maximum Price or Time for Completion."
   f. Insert the name and title of the Valley Construction Company personnel executing the letter.
5. Deletions to Notice Letter: Valley Construction Company must delete all bold face type in the Notice Letter.
6. Follow-up to Notice Letter: The Notice Letter must be followed-up by Valley Construction Company as follows:
   a. Obtain instructions from the Owner or Architect as to the manner in which it should proceed with its work affected by the errors, inconsistencies, ambiguities or omissions in the Contract Document.
   b. Until such instructions are received, Valley Construction Company must not perform any work that is affected by the reported error, omission or inconsistency.
   c. Based upon the nature of said instructions and their impact on the cost and/or time to perform the Work, Valley Construction Company may be required to follow-up with its submission of a request for an extension of time within five (5) days of its receipt of such instructions (See Notice Letter No. 13); and its submission of a Change Order Notice requesting an adjustment the GMP and/or the Contract Time within ten (10) days of its receipt of said instructions. (See Notice Letters No. 19A and 19B) and the follow-up instructions to each of those Notice Letters.
   d. If the Owner or the Architect delays providing the instructions such that it is delaying the work, then Valley Construction Company may be required to follow-up with its submission of a request for an extension of time within five (5) days of its determination that a delay is occurring (See Notice Letter No. 13); and its submission of a Change Order Notice requesting an adjustment of the GMP and/or the Contract Time within ten (10) days of its determination that a delay is occurring (See Notice Letters No. 19A and 19B) and the follow-up instructions to each of those Notice Letters.

Example Two

The Construction Contract requires that the Construction Company issue a Notice upon the discovery of hazardous materials on site. The specific language in the Contract may read as follows:

3.3.8 Unless otherwise agreed by the parties, Construction Manager shall have no responsibility for the discovery, presence, handling, removal or disposal of Hazardous Substances existing on the Project site prior to the date of this Agreement. In the event Construction Manager encounters on the site material reasonably believed to be Hazardous Substances existing prior to the date of the Agreement, Construction Manager shall immediately stop Work in the area affected and report the condition to Owner in writing. The Work in the affected area shall not thereafter be resumed except by written agreement of Owner and Construction Manager if in fact the material is Hazardous Substances. The Work in the affected area shall be resumed in the absence of Hazardous Substances, or when any necessary corrective action has been taken, at the direction of the Owner. Subject to Construction Manager's obligation under Section 2.10.2 below, Owner shall indemnify and hold harmless the Construction Manager from and against claims, damages, losses and expenses (including, but not limited to, attorneys' fees, and costs of litigation) arising out of or resulting from Hazardous Substances existing on the site prior to the date of this Agreement.

The foregoing Contract provision therefore requires a proper Notice, which has already been contemplated by the Construction Company's legal and project team and is incorporated into the ProjectNotice® system as Letter No. 4, Discovery of Hazardous Material on Site. The specific Contract provision is included, either in the accompanying "hard copy" manual or reference guide, the CD-ROM (as a hyperlink in the left column as is demonstrated in FIG. 1), or both. The Form of Letter Notice 4 is readily extracted by clicking the Letter No. 4 hyperlink in the left column on the ProjectNotice® GUI, which opens the following form Notice letter in the right screen of the ProjectNotice® window on the computer monitor:

---

[Insert Date]
ABC Real Property Development
Support Services Building
1000 Chestnut Street
Philadelphia, Pennsylvania 21110
Attention: William Jackson
Re:   World Industries Building and Parking Garage
     [Insert Reference to Subject Matter]
Dear Mr. Jackson:
Pursuant to the Construction Management Agreement, including Article 3.3.8, Construction Phase and Construction Services, Valley Construction Company notifies the Owner of the following preexisting hazardous materials discovered at the site:
[Identify the details of the preexisting Hazardous Substance which Valley Construction Company reasonably believes was encountered, the location(s) it was discovered, the date on which it was discovered and the Work affected.]
We are stopping work in the area affected by the hazardous material and will resume such work when the Owner takes adequate steps to render the materials harmless. Pursuant to the terms of the Contract, the Owner is to indemnify Valley Construction Company from all costs incurred resulting from Hazardous Substances existing on the site prior to the date of the Contract. We are notifying you pursuant to Article 5.7, Extensions of Time and Article 8, Changes, that we will be seeking an extension of time and an increase to the GMP for additional costs that may be incurred. At the present time our estimate of the probable effect of such delays on the progress of the Work is [insert Valley Construction Company's estimate and the reasons justifying said estimate].
Upon the completion of your remedial efforts, we will be in a position to advise you of the total increased Costs that we have incurred and the total extension of Time that we are entitled to receive as a result of the discovery of the hazardous materials and request that a change order be issued to address any such increase in Cost or Time.
If you have any questions, please contact our office
Sincerely,
VALLEY CONSTRUCTION COMPANY
[Insert name and title]
cc: Thomas Jones, Esq.

---

Directions for use of Notice Letter 4 also are included, either in the accompanying "hard copy" manual or reference guide, the CD-ROM (as a hyperlink in the left column as is demonstrated in FIG. 1), or both. The directions for use of Notice 1 may read as follows:

Instructions for the Issuance of Notice Letter No. 1

1. Addressee: Notice Letter must be sent to Addressee designated in the Letter, unless the identity of the Addressee has been properly changed by the Owner.
2. Delivery of Notice Letter: The Notice Letter must be sent by either personal hand delivery, by a nationally registered overnight delivery service or by certified mail, return receipt requested.
3. Time for Sending Notice Letter: Notice Letter must be sent immediately upon Valley Construction Company's discovery of materials it reasonably believes to be Hazardous Substances existing on the site prior to the Agreement. No other specific time period for sending the Notice Letter is set forth in the Contract Documents.
4. Required Information to be Inserted in Notice Letter: Open spaces for Valley Construction Company's inclusion of required information have been incorporated into the Notice Letter. Valley Construction Company must insert in or enclose with the Notice Letter the following information before sending the letter:
   a. The date of the Notice Letter.
   b. Identify subject matter in reference line.
   c. Identify the details of the preexisting Hazardous Substances which Valley Construction Company reasonably believes was encountered, the location(s) it was discovered, the date on which it was discovered and the Work affected.
   d. Insert Valley Construction Company's estimate of the probable effect of such delays on the progress of the work and the reasons justifying said estimate.
   e. Insert the name and title of the Valley Construction Company personnel executing the letter.
5. Deletions to Notice Letter: Valley Construction Company must delete all bold face type in the Notice Letter.
6. Follow-up to Notice Letter: Notice Letter should be follow-up by Valley Construction Company stopping work in the area affected by the hazardous material and resuming such work when the Owner takes adequate steps to render the materials harmless. The Owner is obligated to indemnify and hold Valley Construction Company harmless from all costs incurred by reason of the discovery of preexisting Hazardous Substances. Based upon the nature of and timeliness of the Owner's response, Valley Construction Company may be required to follow-up with its submission of a Claim for an adjustment to the GMP and Contract Time. See Notice Letters No. 19A and 19B and the follow-up instructions thereto. Such follow-up action (with the exception of the aforementioned Notice Letters) is not within the scope of the ProjectNotice® and must be separately developed, monitored and/or supplied by Valley Construction Company.

Example Three

The Construction Contract requires that the Construction Company issue a Notice if it intends to use explosives on the project site. The specific language in the Contract may read as follows:

3.3.17 Construction Manager shall not use explosives at or about the Project site, nor allow explosives of any type or nature to be brought upon the Project site, without prior written authorization from Owner. Any use or storage of explosives at or about the Project site which is authorized by Owner shall be in accordance with Applicable Laws. In the event that open flames, explosives or other hazardous materials or equipment or unusual methods or means will be used in the performance of the Work, Construction Manager shall use and ensure the use of Subcontractors and Sub-subcontractors at any tier, the utmost care and shall ensure adequate supervision thereof by qualified and experienced personnel. Construction Manager shall be responsible for ensuring that the temporary storage of materials and equipment and their loading and unloading, shall be conducted so as not to endanger persons, property or the Work.

The foregoing Contract provision therefore requires a proper Notice, which has already been contemplated by the Construction Company's legal and project team and is incorporated into the ProjectNotice® system as Letter No. 9, Intention to Use Explosives on the Project Site. The specific Contract provision is included, either in the accompanying "hard copy" manual or reference guide, the CD-ROM (as a hyperlink in the left column as is demonstrated in FIG. 1), or both. The Form of Notice Letter 9 is readily extracted by clicking the Letter No. 9 hyperlink in the left column on the ProjectNotice® GUI, which opens the following form Notice letter in the right screen of the ProjectNotice® window on the computer monitor:

---

[Insert Date]
ABC Real Property Development
Support Services Building
1000 Chestnut Street
Philadelphia, Pennsylvania 21110
Attention: William Jackson
Re:       World Industries Building and Parking Garage
          [Insert Reference to Subject Matter]
Dear Mr. Jackson:
Pursuant to the Construction Management Agreement, Article 3.3.17 of Construction Phase and Construction Services, Valley Construction Company notifies the Owner of its intention to bring or use explosives on the Project site as follows [As applicable, choose one of the following]:
[Identify the nature of the explosives and work involved, the location of the work andinclude a schedule of operations.]
[or]
[Identify the type of explosives Valley Construction Company intends to bring onto the Project site, where Valley Construction Company intends to store the explosives and for what purpose the explosives will be stored on site.]
We request that you provide us with your authorization to perform our Work as noticed above.
Sincerely,
VALLEY CONSTRUCTION COMPANY
[Insert name and title]
cc: Thomas Jones, Esq.

---

Directions for use of Notice Letter 9 also are included, either in the accompanying "hard copy" manual or reference guide, the CD-ROM (as a hyperlink in the left column as is demonstrated in FIG. 1), or both. The directions for use of Notice 1 may read as follows:

Instructions for the Issuance of Notice Leter No. 9

1. Addressee: Notice Letter must be sent to Addressee designated in the Letter, unless the identity of the Addressee has been properly changed by the Owner.
2. Delivery of Notice Letter: The Notice Letter must be sent by either personal hand delivery, by a nationally registered overnight delivery service or by certified mail, return receipt requested.
3. Time for Sending Notice Letter: Notice Letter must be sent prior to Valley Construction Company using explosives or bringing explosives onto the Project site. No other specific time period for sending this Notice Letter is set forth in the Contract Documents.
4. Required Information to be Inserted in Notice Letter: Open spaces for Valley Construction Company's inclusion of required information have been incorporated into the Notice Letter. Valley Construction Company must, insert in or enclose with the Notice Letter the following information before sending the letter:
   a. The date of the Notice Letter.
   b. Insert subject matter in reference line.
   c. Insert, as applicable, one of the following:
      i. Identify the nature of the explosives and work involved, the location of the work and include a schedule of operations. [or]
      ii. Identify the type of explosives Valley Construction Company intends to bring onto the Project site, where Valley Construction Company intends to store the explosives and for what purpose the explosives will be stored on site.
   d. Identify the name and title of the individual executing the Notice Letter.
5. Deletions to Notice Letter: Valley Construction Company must delete all bold face type in the Notice Letter.
6. Follow-up to Notice Letter: The Notice Letter must be followed-up by Valley Construction Company as follows:
   a. Obtain the Owner's authorization of the use of explosives, or storage of same on the Project site.
   b. If approval is obtained, storage must be in accordance with applicable laws.
   c. If explosives are to be used in the performance of the Work, Valley Construction Company must ensure the safe usage of same by its Subcontractors and Sub-subcontractors at any tier.
   d. Such follow-up action is not within the scope of ProjectNotice® and must be separately developed, monitored and/or supplied by Valley Construction Company.

While the foregoing is directed to various embodiments of the invention, other and further embodiments of the invention may be devised without departing from the basic scope thereof, and the scope thereof is determined by the claims that shall follow in the non-provisional application which shall claim priority hereto.

As such, those skilled in the art will appreciate that the conception, upon which this disclosure is based, may readily be utilized as a basis for the designing of other structures, methods and systems for carrying out the several purposes of the present invention.

Further, the purpose of the foregoing description is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for managing implementation of a construction project, comprising:
   a computer;
   a display operable by the computer; and
   a memory medium including machine readable instructions stored in the memory medium which, when executed by a processor of the computer, enable the computer:
      to generate a menu of notice-triggering events of the construction project based upon contractual information requiring notice;
      to generate a list of notice documents executable in response to each of the notice-triggering events;
      in response to an operator selection, to retrieve a specific notice document selectively pertaining to a specific notice-triggering event; and
      to produce the specific notice document pertaining to the specific notice-triggering event.

2. The system of claim 1, wherein the machine readable instructions, when executed by the processor, enable the computer to provide the menu of notice-triggering events with hyperlinks to portions of the contractual information requiring notice pertaining to each notice-triggering event.

3. The system of claim 1, wherein the machine readable instructions, when executed by the processor, enable the computer to provide the menu of notice-triggering events with hyperlinks to the notice documents selectively pertaining to each of the notice-triggering events.

4. The system of claim 1, wherein the menu of notice-triggering events is formatted as a table of contents.

5. The system of claim 1, wherein the list of notice documents is formatted as a table of contents.

6. The system of claim 1, wherein the machine readable instructions, when executed by the processor, enable the computer to perform at least one of the following: (i) produce on the display, or (ii) produce in a form of a computer printout, at least one of the following:
   the menu of notice-triggering events;
   the list of notice documents selectively pertaining to each notice-triggering event;
   in response to the operator's selection, the specific notice document selectively pertaining to the specific notice-triggering event; and
   the contractual information requiring notice pertaining to the specific notice-triggering event.

7. The system of claim 1, wherein the specific notice document includes pre-formatted blank fields for entering supplemental data pertaining to at least one of the following: (i) the specific notice-triggering event, (ii) the notice document, or (iii) the contractual information requiring notice pertaining to the specific notice-triggering event.

8. The system of claim 7, wherein the supplemental data includes at least one of the following: (i) date(s) of occurrence of the specific notice-triggering event, (ii) date of execution of the specific notice document, and (iii) any additional information pertaining to the specific notice-triggering event that is required by the contractual information.

9. The system of claim 8, wherein the notice document further comprises operator instructions for entering the supplemental data in the pre-formatted blank fields based on the contractual information requirements.

10. The system of claim 7, wherein the pre-formatted blank fields are for entering specific supplemental data relative to the notice-triggering event as required by the contractual information requiring notice of the notice-triggering event.

11. The system of claim 1, wherein the memory medium is a portion of a memory device of the computer or a transferable memory medium.

12. The system of claim 1, wherein the computer is provided with a means of a Graphical User Interface (GUI).

13. The system of claim 1, wherein the machine readable instructions, when executed by the processor, enable the computer to provide the list of notice documents with hyperlinks to instructions selectively pertaining to each of the notice documents.

14. The system of claim 13, wherein the instructions include follow-up tasks and events.

15. The system of claim 1, wherein the notice-triggering events comprise any event wherein the operator is contractually required to give notice to or obtain consent or approval from a party or parties before at least one of the following: (i) taking further action under the contract, (ii) accruing rights under the contract, or (iii) complying with requirements of the contract.

16. The system of claim 1, wherein the machine readable instructions, when executed by the processor, enable the computer to provide the list of notice documents with hyperlinks to the notice documents selectively pertaining to each notice document in the list.

17. The system of claim 1, wherein the notice documents comprise of all notice information and requirements as required by the contractual information selectively pertaining to the notice-triggering events that was known prior to commencement of the construction project.

18. A method for managing implementation of a construction project, the method comprising the steps of:
   generating a computerized menu of notice-triggering events of the construction project based upon contractual information requiring notice;
   generating a computerized list of notice documents executable in response to each of the notice-triggering events;
   in response to an operator selection, retrieving a specific notice document selectively pertaining to a specific notice-triggering event; and
   producing the specific notice document pertaining to the specific notice-triggering event.

19. The method of claim 18, further comprising the step of providing the menu of notice-triggering events having hyperlinks to the notice documents selectively pertaining to each of the notice-triggering events.

20. The method of claim 18, further comprising the step of providing the menu of notice-triggering events having hyperlinks to portions of the contractual information requiring notice pertaining to each of the notice-triggering events.

21. The method of claim 18, wherein the menu of notice-triggering events is formatted as a table of contents.

22. The method of claim 18, wherein the list of notice documents is formatted as a table of contents.

23. The method of claim 18, further comprising:
generating the menu of notice-triggering events, the list of notice documents, at least portions of the contractual information selectively pertaining to the notice-triggering events, and, in response to the operator's selection, the specific notice document selectively pertaining to the specific notice-triggering event, either on a computer display or in a form of a computer printout.

24. The method of claim 18, wherein the specific notice document includes pre-formatted blank fields for entering supplemental data pertaining to at least one of the following: (i) the specific notice-triggering event, (ii) the notice document, or (iii) the contractual information requiring notice pertaining to the specific notice-triggering event.

25. The method of claim 24, wherein the supplemental data includes at least one of the following: (i) date(s) of occurrence of the specific notice-triggering event, (ii) date of execution of the specific notice document, and (iii) any additional information pertaining to the specific notice-triggering event that is required by the contractual information.

26. The method of claim 25, wherein the notice document further comprises operator instructions for entering the supplemental data in the pre-formatted blank fields based on the contractual information requirements.

27. The method of claim 24, wherein the pre-formatted blank fields are for entering specific supplemental data relative to the notice-triggering event as required by the contractual information requiring notice of the notice-triggering event.

28. The method of claim 18, further comprising the step of providing list of notice documents having hyperlinks to instructions selectively pertaining to each of the notice documents.

29. The method of claim 28, wherein the instructions include follow-up tasks and events.

30. The method of claim 18, wherein the notice-triggering events comprise any event wherein the operator is contractually required to give notice to or obtain consent or approval from a party or parties before at least one of the following: (i) taking further action under the contract, (ii) accruing rights under the contract, or (iii) complying with requirements of the contract.

31. The method of claim 18, further comprising the step of forwarding the specific notice document to recipient(s) as designated by the contractual information requiring notice and in the manner as required by said contractual information.

32. The method of claim 18, further comprising the step of providing the list of notice documents having hyperlinks to instructions selectively pertaining to each of the notice documents.

33. The method of claim 18, further comprising the step of providing the list of notice documents having hyperlinks to the notice documents selectively pertaining to each notice document in the list.

34. A computer recording medium storing software that, when executed by a processor, causes a computer system to perform a method for managing implementation of a construction project, the method comprising the steps of:
generating a computerized menu of notice-triggering events of the construction project based upon contractual information requiring notice;
generating a computerized list of notice documents executable in response to each of the notice-triggering events;
in response to an operator selection, retrieving a specific notice document selectively pertaining to a specific notice-triggering event; and
producing the specific notice document pertaining to the specific notice-triggering event.

* * * * *